(12) United States Patent
Fortmann et al.

(10) Patent No.: US 8,390,138 B2
(45) Date of Patent: Mar. 5, 2013

(54) WIND ENERGY INSTALLATION WITH NEGATIVE SEQUENCE SYSTEM REGULATION AND OPERATING METHOD

(75) Inventors: Jens Fortmann, Berlin (DE); Heinz-Hermann Letas, Suessel (DE)

(73) Assignee: REpower Systems AG, Hamburg (DE)

( * ) Notice: Subject to any disclaimer, the term of this patent is extended or adjusted under 35 U.S.C. 154(b) by 798 days.

(21) Appl. No.: 12/515,714

(22) PCT Filed: Nov. 20, 2007

(86) PCT No.: PCT/EP2007/010026
§ 371 (c)(1),
(2), (4) Date: May 20, 2009

(87) PCT Pub. No.: WO2008/061698
PCT Pub. Date: May 29, 2008

(65) Prior Publication Data
US 2010/0052322 A1 Mar. 4, 2010

(30) Foreign Application Priority Data
Nov. 20, 2006 (DE) .......................... 10 2006 054 870

(51) Int. Cl.
F03D 7/00 (2006.01)
F03D 9/00 (2006.01)
(52) U.S. Cl. .............. 290/44; 290/55; 290/40 R; 322/44
(58) Field of Classification Search .................. 290/44, 290/55, 40 R; 322/44, 59; 700/286, 287
See application file for complete search history.

(56) References Cited

U.S. PATENT DOCUMENTS
7,423,412 B2 * 9/2008 Weng et al. ..................... 322/20

FOREIGN PATENT DOCUMENTS
| DE | 3206598 | 9/1983 |
| DE | 10228062 | 1/2004 |
| DE | 102007002102 | 7/2007 |
| DE | 102007005165 | 8/2007 |
| WO | WO-97/37236 | 10/1997 |

OTHER PUBLICATIONS
International Search Report mailed Sep. 29, 2008 directed to corresponding International Application PCT/EP2007/010026; (4 pages).

* cited by examiner

*Primary Examiner* — Tran Nguyen
*Assistant Examiner* — Leda Pham
(74) *Attorney, Agent, or Firm* — Morrison & Foerster LLP

(57) ABSTRACT

A wind energy installation can include a generator which is driven by a rotor and generates electrical power in a multiphase manner for feeding into a network, a converter which is connected to the generator and to the network, and a control system which interacts with the converter and includes a negative sequence system regulation mechanism. The negative sequence system regulation mechanism can include a phase control module configured to determine an electrical variable of the negative sequence system according to the phase. Accordingly, an available current can be provided according to the operating situation for active power or idle power in the negative sequence system regulation mechanism. The negative sequence system regulation mechanism can thus help stabilize the network in the event of asymmetrical network conditions. Also, this relates to a correspondingly equipped wind park and an operating method.

16 Claims, 2 Drawing Sheets ial application No. PCT/EP2007/
WIND ENERGY INSTALLATION WITH NEGATIVE SEQUENCE SYSTEM REGULATION AND OPERATING METHOD

REFERENCE TO RELATED APPLICATIONS

This application is a national stage application under 35 USC 371 of International Application No. PCT/EP2007/010026, filed Nov. 20, 2007, which claims the priority of German Patent Application No. 10 2006 054 870.1, filed Nov. 20, 2006, the contents of which prior applications are incorporated herein by reference.

FIELD OF THE INVENTION

The invention relates to a wind energy installation comprising a rotor, comprising a polyphase generator, comprising a converter connected to the generator and a grid, and comprising a controller which interacts with the converter and comprises a negative phase sequence system regulation mechanism, and to a corresponding wind farm and operating method.

BACKGROUND OF THE INVENTION

In many electricity grids, a considerable portion of the power is already being generated by wind energy installations. Besides the advantage of regenerative energy generation and decentralized supply of active power, they afford the advantage that in order to support the grid in the event of a fault, reactive power can also be provided in a decentralized manner by modern wind energy installations. It is thus possible to react effectively to balanced grid faults. However, difficulties can occur in the event of unbalanced grid faults. Oscillations can then occur in the drivetrain of the wind energy installation. Such oscillations load the rotor-generator system and increase the risk of failure of a wind energy installation.

It has been proposed to counteract torque oscillations caused by unbalanced grid faults by means of a so-called negative phase sequence system regulation mechanism. Such a mechanism has been described in an article "Transient Performance of Voltage Source Converter under Unbalanced Voltage Dips" by Magueed, F. et al. A negative phase sequence system is formed in concurrently rotating d, q coordinates, such that it becomes a DC signal. Current unbalances occurring in the generator can be compensated for by addition and inverse transformation. The torque oscillations are thereby reduced. However, that is confronted by a disadvantage, namely that larger voltage unbalances occur in return. In this respect, the grid is therefore loaded with additional unbalance.

Although it is known that synchronous generators can be provided in the grid in order to provide a remedy, this gives rise to additional outlay.

SUMMARY OF THE INVENTION

The invention is based on the object of improving wind energy installations of the type mentioned in the introduction to the effect of reducing harmful reactions on the grid in the event of unbalanced grid faults.

In the case of a wind energy installation comprising a generator which is driven by a rotor and generates electrical power in a polyphase manner for feeding into a grid, comprising a converter connected to the generator and the grid, and comprising a controller which interacts with the converter and comprises a negative phase sequence system regulation mechanism, the invention provides for the negative phase sequence system regulation mechanism to have a phase control module designed to determine an electrical variable of the negative phase sequence system in a phase-specific manner.

The invention is based on the concept of enabling a correction of unbalanced components in the grid by performing a phase-specific division into a positive phase sequence system and a negative phase sequence system. The invention thus makes use of the known fact that a real polyphase grid can be described by a system with synchronously concurrently rotating coordinates (positive phase sequence system), an oppositely rotating system (negative phase sequence system) and a zero phase sequence system. The latter is not transmitted by the transformers usually used, and so a consideration of the positive and negative phase sequence systems suffices. In the positive phase sequence system rotating synchronously with the phase vector, balanced components of current and voltage in the grid are represented as DC components, and unbalanced components as a component having double the grid frequency (therefore as a 100 Hz component given a grid frequency of 50 Hz). This component is referred to hereinafter for short as 100 Hz component. Correspondingly, in the negative phase sequence system, unbalanced components are represented as a DC component, and balanced components as a 100 Hz component.

The heart of the invention is the insight of providing a phase-specific regulation in the negative phase sequence system. Taking account of the phase permits a subdivision into active and reactive components to be performed in the negative phase sequence system. In this case, active component in the negative phase sequence system means, analogously to the positive phase sequence system, a power or a current which is in phase with the negative phase sequence system. Correspondingly, reactive component in the negative phase sequence system means a power or a current which is in antiphase with the negative phase sequence system. This makes it possible to provide the current available in the wind energy installation (said current usually being limited by thermal limits of the current-carrying components) depending on the operation situation for active or reactive power in the negative phase sequence system. With the phase-specific negative phase sequence system regulation, the current can therefore be utilized additionally and precisely in the event of unbalanced grid conditions optimally for the purpose of stabilizing the grid. Synchronous generators for maintaining the stability in the grid are then no longer necessary or necessary only to a reduced extent.

In principle, a separate consideration of active and reactive systems in the regulation of wind energy installations is known, but restricted to balanced conditions in the grid (that is to say in the positive phase sequence system in accordance with the terminology used here). For unbalanced conditions, although it has been proposed to provided a negative phase sequence system regulation (Saccomando, G. et al.: "Control and Operation of Grid-connected Voltage Source Converter Under Grid Disturbances in Variable-speed Wind Turbines"), this regulation is effected entirely in a phase-nonspecific manner. It serves only to reduce the unbalanced compensation currents caused by an unbalanced grid in the generator.

The regulation is expediently embodied in such a way that during normal operation of the wind energy installation (that is to say when grid faults are not manifested) primarily the active component of the negative phase sequence system is reduced, to be precise preferably as far as possible to a value of zero. What is achieved by means of a smallest possible active component in the negative phase sequence system is that torque oscillations of the generator-rotor system that result from unbalances in the grid are reduced or avoided. The considerable mechanical loadings which conventionally occur in the event of unbalances in the grid can therefore be effectively combated.

Furthermore, the regulation is expediently further embodied in such a way that during normal operation the reactive component of the negative phase sequence system current is regulated to a value not equal to zero. A highest possible desired value for the reactive component is preferably set in this case, in particular the maximum current permissible for the wind energy installation or the grid. Unlike in the case of the active component regulation, therefore, the regulation actually does not involve regulating toward a smallest possible value, rather an entirely different regulation aim is pursued. By virtue of the fact that the regulation in the negative phase sequence system is phase-specific according to the invention, it actually becomes possible for the first time to provide different regulations for active and reactive components.

The regulation in the positive phase sequence system can be provided in a conventional manner. In one preferred embodiment of the invention, however, provision can also be made for providing a crossover module, which is designed to combine the regulation of the negative phase sequence system with that of the positive phase sequence system. It can be provided that in the event of a high load at the wind energy installation and correspondingly high currents, the reactive and active components of the current in the negative phase sequence system are reduced, or even no more negative phase sequence system current is fed in. It is thus possible to avoid an overloading of the current-carrying components of the wind energy installation precisely in the event of a high load. In the event of strong wind, the power of the wind energy installation can be fully utilized, while in the event of weaker wind, according to the invention current is fed into the grid for stabilization via the negative phase sequence system. A power observer is preferably provided for this purpose, which interacts with the phase-specific regulation of the negative phase sequence system. It is designed to determine the respective load state of the wind energy installation and to determine the current reserve available for regulation by the negative phase sequence system. It is advantageously provided that the regulation of the negative phase sequence system is restricted only temporarily, to be precise in particular in situations at high rotor rotational speeds. An overloading of the converter of the wind energy installation by overcurrent or overvoltage in the intermediate circuit can thus be prevented. Furthermore, a limit threshold below which unbalances are tolerated and not corrected by the negative phase sequence system regulation mechanism can expediently be predetermined. For this purpose, a threshold value switch can be provided, which can advantageously be integrated into the power observer.

The regulation is expediently further embodied in such a way that in the event of a grid fault, such as an unbalanced voltage dip in the grid, for example, primarily the reactive component is regulated in the negative phase sequence system. The voltage unbalance can be counteracted in this way. Provision can be made for exclusively regulating the reactive component in the negative phase sequence system in the event of a fault. It is preferred, however, to provide a weighing-up module for the regulation of the negative phase sequence system. It is designed to divide the available current between active and reactive components of the negative phase sequence system in the event of grid faults depending on the type and severity of the grid fault, in particular the voltage unbalance. It is particularly preferred if the weighing-up module is additionally designed also to include the active and reactive components of the positive phase sequence system. A priority module can be provided, which prescribes adapted regulating priorities depending on the loading of the wind energy installation and the grid fault situation for the regulation of the negative phase sequence system, and if appropriate also for that of the positive phase sequence system.

It is favorable in principle to feed in as much active current as possible in the positive phase sequence system during normal operation; reference values for the regulation are preferably prescribed here on the basis of the torque regulation known per se or the power regulation of the wind energy installation, if appropriate adapted to the electrical stipulations of the connected electrical grid. The reactive current in the positive phase sequence system is determined depending on the active current fed in or in accordance with the voltage regulation of the grid. In this respect, the regulation is known per se. With next priority, an active component for the current in the negative phase sequence system is calculated by means of the phase-specific regulation according to the invention of the negative phase sequence system. This results in a reduction of the oscillations, in particular for the generator and/or the intermediate circuit of the converter. If necessary or desired, with lower priority it is then possible to determine a reactive component of the negative phase sequence system in order to reduce unbalanced voltages that possibly occur. If a fault situation in the grid is identified, however, then the priority module prescribes changed priorities. In this case, the dependence on the grid fault and the present operating point can distinguish the priority module between the priority of grid stabilization or installation preservation. If the priority module prescribes grid stabilization, as a matter of priority reactive current is supplied in the positive and negative phase sequence systems, depending on the balanced and unbalanced components of the voltage that occurs. If the priority module prescribes installation preservation, as a priority active current is supplied in the positive phase sequence system in order to be able to correct oscillations in the drivetrain and/or rotational speed changes. The remaining regulation reserves can then be made available to the respective other system. For this purpose, a specific division module can be provided, which determines the ratio of the active and reactive currents in the positive phase sequence system to those in the negative phase sequence system depending on the available current and the power reserve. The division module can be embodied in dynamic fashion, or a static unit, for example in the form of a table, can be implemented.

The controller of the wind energy installation preferably contains a model of the section to be regulated. Advantageously, a dedicated section model in particular of the generator is implemented for the phase-specific regulation of the negative phase sequence system. It has been shown that essential characteristics in particular of the rotor of the generator have a considerable frequency dependence which can be taken into account optimally by a dedicated section model in particular with regard to the 100 Hz oscillation.

The invention furthermore relates to a wind farm in which a phase-specific regulation in the negative phase sequence system is effected in a decentralized manner at one or a plurality of wind energy installations or it is provided in a central control device (wind farm master).

In addition, the invention relates to a corresponding method for operating a wind energy installation and/or a wind farm. For elucidation, reference is made to the explanations above, which are also analogously applicable to the method.

BRIEF DESCRIPTION OF THE DRAWINGS

The invention is elucidated below on the basis of an advantageous exemplary embodiment with reference to the accompanying drawing in which.

DETAILED DESCRIPTION OF THE INVENTION

Figure 1:
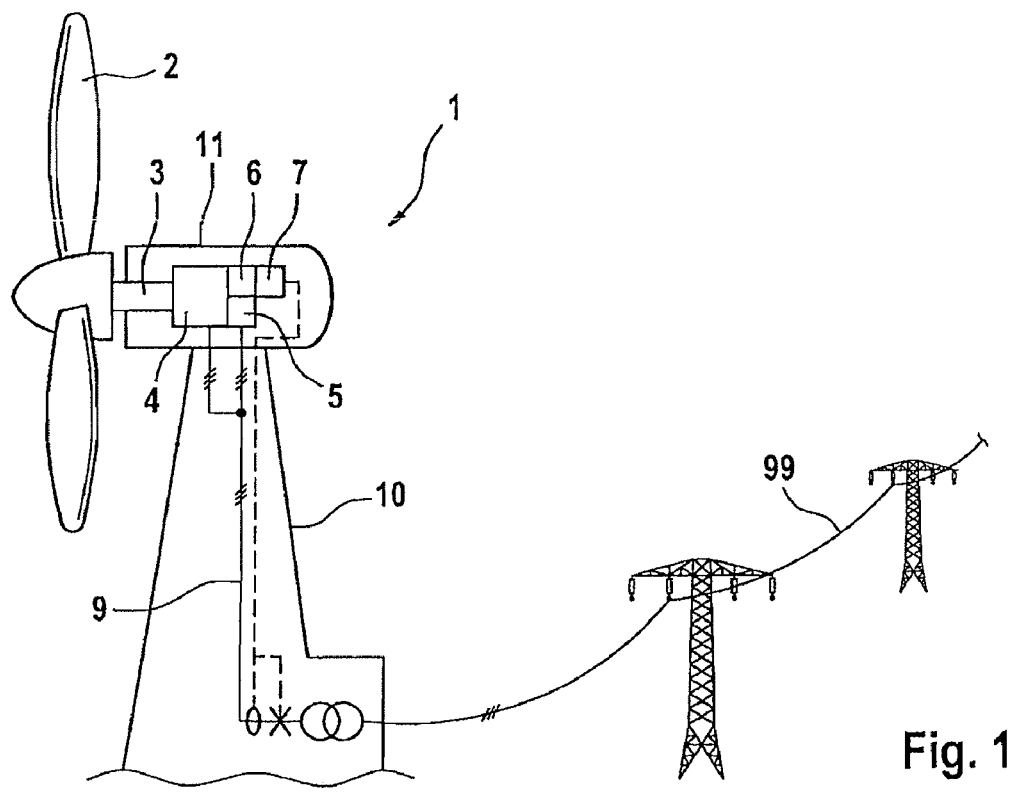
FIG. 1 shows a schematic view of a wind energy installation according to the invention.
Figure 2:
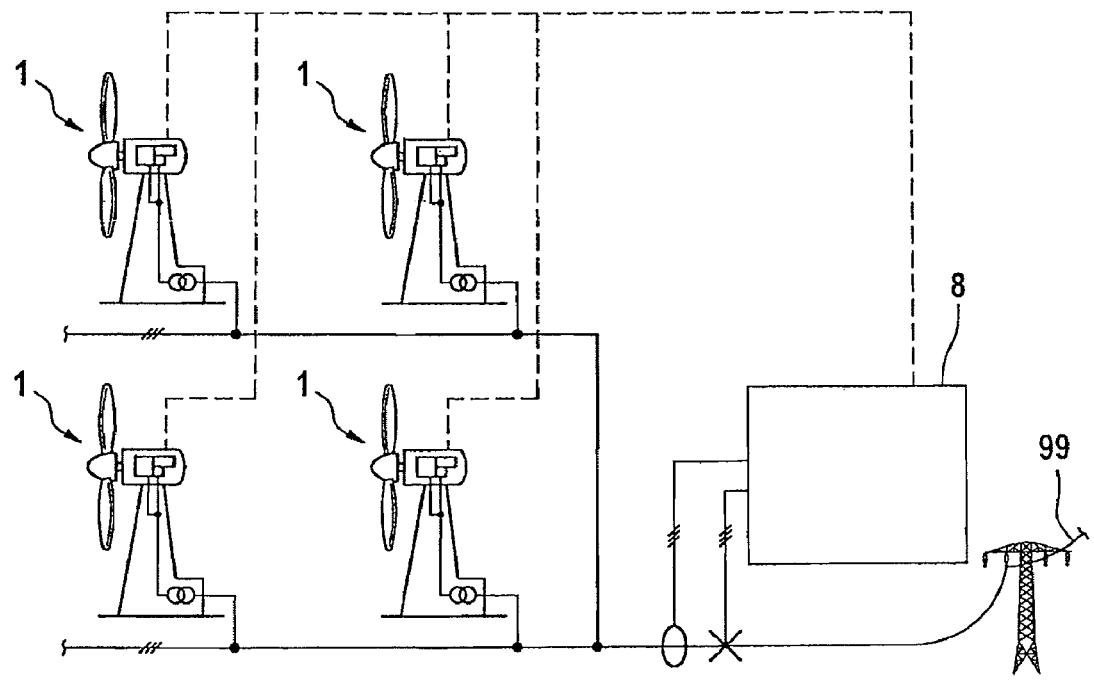
FIG. 2 shows a schematic view of a wind farm according to the invention.

A wind energy installation 1 in accordance with one exemplary embodiment of the invention is illustrated in FIG. 1. It comprises a machine house 11 arranged rotatively on a tower 10, a rotor 2 being arranged rotatively at one end of said machine house. Said rotor drives a generator 4 via a rotor shaft 3, said generator being embodied as a doubly fed asynchronous generator in the exemplary embodiment illustrated. The generator is connected by its stator to connecting lines 9 connected to a supply grid 99 via an optional transformer. A converter 5 is furthermore provided, via which the rotor of the generator is connected to the connecting lines 9.

Figure 3:
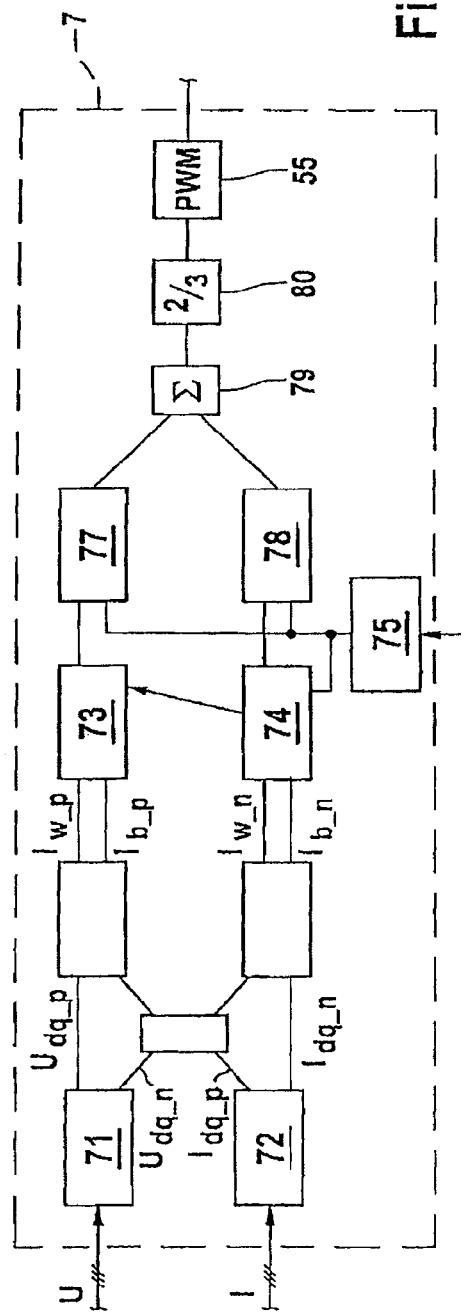
FIG. 3 shows a block view of the converter controller with the negative phase sequence system regulation mechanism.

A controller 6 is provided, which is designed for controlling the operation of the wind energy installation. It is connected to the components of the wind energy installation via signal lines (not specifically illustrated). The controller 6 has a communication interface, with the result that remote control via telephone or data lines is made possible. Furthermore, in the case of a wind energy installation installed in a wind farm, the communication interface serves for communication with a wind farm master 8. In particular, the controller 6 serves for controlling the converter 5 and has a converter control module 7 for this purpose. The invention does not show external compensation modules possibly present (e.g. Statcom, SVC), which may likewise be present as reactive power sources in the wind farm.

order to elucidate the construction and the functioning of the converter control module 7, reference is made to FIG. 3, in particular. Measuring sensors for voltage and current are arranged on the connecting lines 9 leading to the grid 99. The measurement values are applied to inputs of the converter control module 7. A signal for the phase θ in the grid 99 or the connecting lines 9 is furthermore applied to an input. A coordinate transformation into a rotating system is carried out in an input stage of the converter control module 7. A block 71 for the transformation of the voltage values and a block 72 for the transformation of the current values are provided for this purpose. The transformation is effected in a manner known per se into a system rotating synchronously with the phase (positive phase sequence system) and an oppositely rotating system (negative phase sequence system). In this case, balanced components of voltage and current in the positive phase sequence system are represented as DC components, and unbalanced components as an AC component having a frequency corresponding to double the grid frequency (that is to say 100 Hz in the case of 50 Hz grids and 120 Hz in the case of 60 Hz grids). This AC component will be referred to as 100 Hz component hereinafter. Unbalanced components of voltage and current are represented in the negative phase sequence system as DC components, and balanced components as 100 Hz components. The 100 Hz components can be filtered out by means of corresponding filters (low-pass filter, band-pass filter, etc.). Only DC values in the positive and negative phase sequence systems (identified by index letters p and n, respectively) are then output at the output of the blocks, to be precise as so-called d,q coordinates. The block 71 outputs the voltage values in the positive and negative phase sequence systems and the block 72 outputs the current values in the positive and negative phase sequence systems.

From the values for voltage and current transformed into the d,q coordinate system, the voltage and current values of the positive phase sequence system are applied to a positive phase sequence system regulation block 73. In terms of its construction and function, the positive phase sequence system regulation block 73 largely corresponds to the regulation provided in conventional wind energy installations without negative phase sequence system regulation. A more detailed explanation is therefore unnecessary. The voltage and current values of the negative phase sequence system are applied to a negative phase sequence system regulation block 74. It comprises a phase module 75, which provides a signal regarding the phase θ in the grid for the negative phase sequence system regulation block. Details about the embodiment of the negative phase sequence system regulation block 74 are explained further below.

At its output, the negative phase sequence system regulation block provides actuating signals for active and reactive components Iw_n and Ib_n of the current in the negative phase sequence system and also a value for a reactive current Ib_p in the positive phase sequence system. The latter interacts with output signals of the positive phase sequence system regulation block 73 embodied in a manner known per se. The output signals of the two regulation blocks are converted in each case separately into a stationary two-dimensional coordinate system taking account of the phase θ in the grid by means of inverse transformation blocks 77, 78. In this coordinate system, the values for the positive and negative phase sequence systems are added at a summation element 79, and finally converted into the three-phase system by means of a further coordinate conversion block 80, and applied as control signals to the converter, to put it more precisely a pulse width modulator 55 controlling the converter 5.

Figure 4:
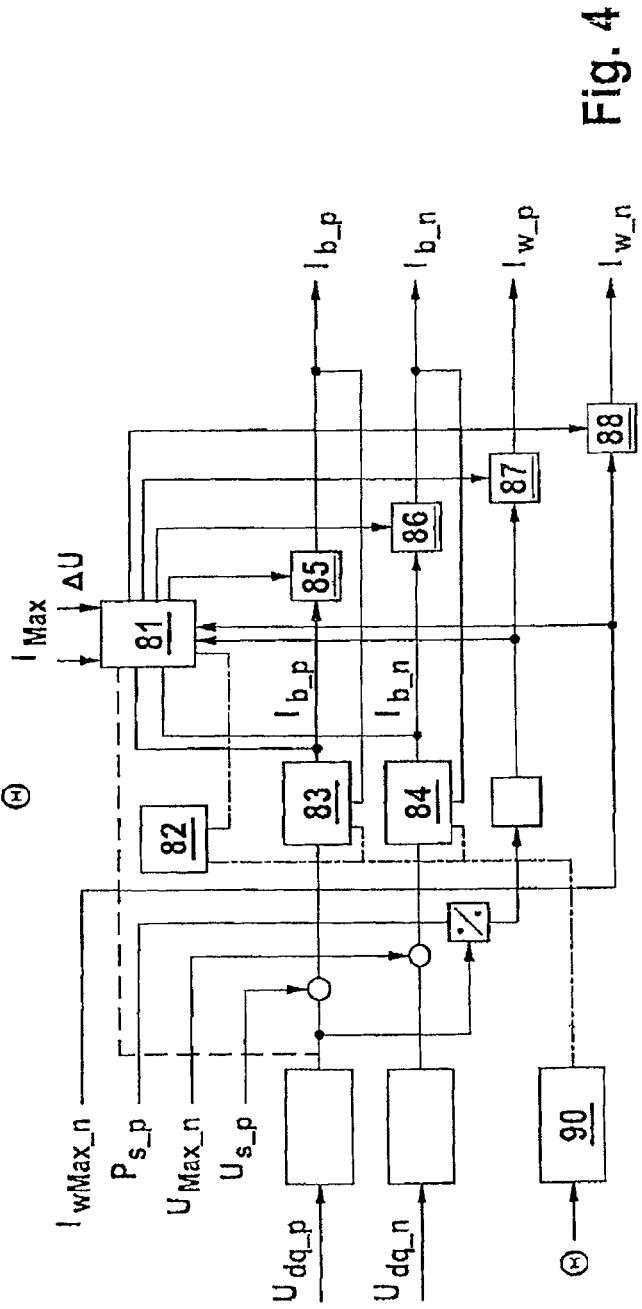
FIG. 4 shows a detail view of the structure of the regulation mechanism in accordance with FIG. 3.

For further elucidation of the regulation blocks 73, 74, reference is made to FIG. 4. Inputs for a plurality of desired signals are additionally illustrated, to be precise a desired value—functioning as a limit value—for the active component of the current in the negative phase sequence system (IwMax_n), a desired value for the active power in the positive phase sequence system (Ps_p), a desired value—functioning as a limit value—for the voltage in the negative phase sequence system (UMax_n) and a desired value for the voltage in the positive phase sequence system (Us_p).

The regulation blocks 73, 74 respectively have a regulator core 83, 84 containing a section model in each case. The separate embodiment for positive and negative phase sequence systems means that it is possible that, for the negative phase sequence system, a different section model is provided in the regulator core 84 of the negative phase sequence system than in the regulator core 83 of the positive phase sequence system. As a result it is possible in particular to take account of differences between positive and negative phase sequence systems such as arise for example from a frequency-dependent rotor resistance of the generator 4.

A power observer 81 is furthermore provided. It serves to determine still permissible limit values for active current and reactive current depending on the load state of the wind energy installation, to be precise expediently both for the positive phase sequence system and for the negative phase sequence system. At the power observer 81 there are inputs for the reactive current in the negative phase sequence system $I_{b\_n}$, for the reactive current in the positive phase sequence system $I_{b\_p}$ and for the voltage value in the positive phase sequence system $U\_p$. A limit value signal for a permissible maximum current $I\_max$ is furthermore provided. The power observer 81 determines therefrom the active power output by the wind energy installation and furthermore calculates limit values for the reactive and active components in the negative phase sequence system and positive phase sequence system taking account of the permissible maximum current $I\_max$. The limit values are applied to corresponding limiter modules 85, 86, 87 and 88. Output signals are reactive and active components in positive and negative phase sequence systems $I_{b\_p}$, $I_{b\_n}$, $I_{w\_p}$ and $I_{w\_n}$. Furthermore, the power observer 81 comprises a threshold value switch, which tolerates unbalances within a specific voltage band AU and in this respect deactivates the negative phase sequence system regulation.

A priority module 82 is assigned to the regulator cores 83, 84. It is designed, in interaction with the power observer 81 and a grid fault detector 80, to perform a weighing up of the current components in the negative phase sequence system, and preferably also in the positive phase sequence system.

The method of operation is as follows here:

During normal operation of the wind energy installation, as much active current as possible is provided in the positive phase sequence system. As a result, depending on the wind conditions respectively prevailing, a maximum amount of compensated power is intended to be fed into the grid 99. The active component in the negative phase sequence system is intended to be reduced to zero as far as possible, in order to counteract harmful and material-loading 100 Hz oscillations of the drivetrain. By contrast, the reactive component of the negative phase sequence system is intended to be regulated to a maximum permissible value for the wind energy installation or the grid 99. By virtue of the power observer 81, provision can be made for varying the currents in the negative phase sequence system depending on the loading state of the wind energy installation. Thus, it may be provided that when the wind is strong and there are therefore (at least temporarily) high currents in the positive phase sequence system, only little or no feeding at all of neither active nor reactive component in the negative phase sequence system takes place. Therefore, precisely in times when there is a high load, it is possible to avoid an overloading of the converter 5, for example by excessively high currents or excessively high voltage amplitudes in the intermediate circuit of the converter 5. The following priority thus arises: the highest priority is accorded to the feeding of active current in the positive phase sequence system, to be precise generally according to stipulation by a superordinate regulation mechanism. The second highest priority is accorded to providing reactive current in the positive phase sequence system for the voltage or frequency regulation in the grid 99. The third priority is accorded to the active current in the negative phase sequence system in order to reduce oscillations. The current remaining for the negative phase sequence system is calculated from the difference between the current in the positive phase sequence system and the permissible maximum current. Finally, the fourth priority is accorded to a further reduction of the voltage of the negative phase sequence system. The magnitude of the reactive current available for this in the negative phase sequence system is determined from the vectorial difference between the remaining current and the active current component thereof.

In the case of a grid fault, which may either be identified by the grid fault detector 80 or be indicated by a corresponding signal from a wind farm master or a control center of the grid operator, a different division of the current is provided by virtue of the priority module 82. Depending on the grid fault and the present operating point, the priority module 82 distinguishes between the priority of grid stabilization or installation preservation. If the priority module prescribes installation preservation, as a priority active current is supplied in the positive phase sequence system in order to be able to correct oscillations in the drivetrain and/or rotational speed changes. If the priority module prescribes grid stabilization, as a matter of priority reactive current is supplied in the positive and negative phase sequence systems, depending on balanced and unbalanced components of the voltage that occurs. A weighing up between the reactive current in the positive phase sequence system $I_{b\_p}$ and the reactive current in the negative phase sequence system $I_{b\_n}$ is performed. While the former has a voltage-stabilizing effect in the grid, the latter provides for a reduction of voltage unbalances. The weighing up can be carried out by means of a table, a family of characteristic curves, a system model or by means of a formula. The ratio of reactive current in the positive phase sequence system to the reactive current in the negative phase sequence system can be calculated as in the following example (with normalized variables)

$$I_{b\_p} = 0.5$$
$$I_{b\_n} = 0.7$$
$$kI = \frac{I_{b\_p}}{I_{b\_n}}$$

The division of the available current between reactive current in the positive phase sequence system and reactive current in the negative phase sequence system is effected with $$I = I_p + I_n$$
$$I_p = \sqrt{I_{w\_p}^2 + I_{b\_p}^2}$$
$$I_n = I_{b\_n} = \frac{I_{b\_p}}{kI}$$
$$I = \sqrt{I_{w\_p}^2 + I_{b\_p}^2} + \frac{I_{b\_p}}{kI}$$

Therefore, in the event of a fault, it is possible to achieve both good stabilization in the grid and effective damping of the drivetrain with respect to the harmful 100 Hz oscillations.

The invention claimed is:

1. A wind energy installation comprising:
   a generator which is driven by a rotor and generates electrical power in a polyphase manner for feeding into a grid;
   a converter connected to the generator and the grid;
   a controller which interacts with the converter and comprises a negative phase sequence system regulation mechanism, the negative phase sequence system regulation mechanism comprising a phase control module configured to determine an electrical variable of a negative phase sequence system in a phase-specific manner; and a priority module that directs the controller to feed in as much active current as possible in a positive phase sequence system during normal operation and to selectively supply reactive current in the positive and negative phase sequence system if a fault situation in the grid is identified, depending on the balanced and unbalanced components of the voltage that occurs.

2. The wind energy installation of claim 1, wherein the negative phase sequence system regulation mechanism comprises an active power regulator.

3. The wind energy installation of claim 2, wherein the active power regulator of the negative phase sequence system regulation mechanism has a desired value input, to which a value equal to zero is applied.

4. The wind energy installation of claim 1, 2, or 3, wherein the negative phase sequence system regulation mechanism comprises a reactive power regulator.

5. The wind energy installation of claim 4, wherein the reactive power regulator has a desired value input, to which a value not equal to zero is applied.

6. The wind energy installation of claim 5, further comprising a power observer configured to determine at least one of an available power and an available current depending on the loading of the wind energy installation and a permissible maximum value for the current.

7. The wind energy installation of claim 6, wherein an output of the power observer is connected to a desired value input of the negative phase sequence system regulation mechanism.

8. The wind energy installation of claim 6, further comprising a limiting module configured to limit at least one of an active and a reactive component of current in the negative phase sequence system depending on the power observer.

9. The wind energy installation of claim 6, further comprising a threshold value switch which acts on the negative phase sequence system regulation mechanism in such a way that unbalances below a threshold are tolerated.

10. The wind energy installation of claim 9, wherein the threshold value switch is integrated into the power observer.

11. The wind energy installation of claim 4, further comprising a crossover module configured to combine regulation of the negative phase sequence system with that of a positive phase sequence system.

12. A wind farm comprising:
a plurality of wind energy installations, each wind energy installation comprising a generator which is driven by a rotor and generates electrical power in a polyphase manner for feeding into a grid, a converter connected to the generator and the grid, and a controller which interacts with the converter;
a wind farm regulation mechanism comprising a negative phase sequence system regulation mechanism having a phase control module configured to determine an electrical variable of a negative phase sequence system in a phase-specific manner; and
a priority module that directs the wind farm regulation mechanism to feed in as much active current as possible in a positive phase sequence system during normal operation and to selectively supply reactive current in the positive and negative phase sequence system if a fault situation in the grid is identified, depending on the balanced and unbalanced components of the voltage that occurs.

13. The wind farm of claim 12, wherein the negative phase sequence system regulation mechanism comprises an active power regulator.

14. The wind farm of claim 12 or 13, wherein the negative phase sequence system regulation mechanism is embodied in the wind farm with the inclusion of external reactive power controllers.

15. A method for regulating a wind energy installation, the wind energy installation comprising a generator which is driven by a rotor and generates electrical power in a polyphase manner for feeding into a grid, a converter connected to the generator and the grid, and a controller which interacts with the converter, comprising the following steps:
detecting current and voltage values for the phases of the grid;
transforming the detected current and voltage values into a positive phase sequence system and a negative phase sequence system;
providing phase-specific regulation in the negative phase sequence system; and
feeding in as much active current as possible in the positive phase sequence system during normal operation and selectively supplying reactive current in the positive and negative phase sequence system if a fault situation in the grid is identified, depending on the balanced and unbalanced components of the voltage that occurs.

16. The method of claim 15, wherein a negative phase sequence system regulation mechanism comprising an active power regulator is used to provide phase-specific regulation in the negative phase sequence system.

* * * * *

UNITED STATES PATENT AND TRADEMARK OFFICE
CERTIFICATE OF CORRECTION

| | | |
|---|---|---|
| PATENT NO. | : 8,390,138 B2 | Page 1 of 1 |
| APPLICATION NO. | : 12/515714 | |
| DATED | : March 5, 2013 | |
| INVENTOR(S) | : Jens Fortmann et al. | |

It is certified that error appears in the above-identified patent and that said Letters Patent is hereby corrected as shown below:

In the Specification:

At column 5, line number 46, please add --In-- in front of the word "order"

At column 7, line number 20, delete "AU" and replace with --ΔU--

Signed and Sealed this
Fourteenth Day of May, 2013

Teresa Stanek Rea
*Acting Director of the United States Patent and Trademark Office*